United States Patent [19]
Lloyd et al.

[11] 3,752,017
[45] Aug. 14, 1973

[54] THERMAL HAND TOOLS

[75] Inventors: Richard E. Lloyd, Beltsville; Loring E. Young, Frederick; William J. Siegel, Silver Spring, all of Md.

[73] Assignee: Pace Incorporated, Silver Spring, Md.; by said Lloyd and Young

[22] Filed: Apr. 8, 1971

[21] Appl. No.: 132,499

Related U.S. Application Data

[63] Continuation-in-part of Ser. No. 41,325, May 28, 1970, abandoned.

[52] U.S. Cl. .................. 81/9.5 B, 219/221, 219/234
[51] Int. Cl. ............................................. H02g 1/12
[58] Field of Search ..................... 81/9.5 B, 9.5 R, 81/9.51, 43; 219/221, 227, 230, 231, 232, 233, 234, 235; 128/303.1, 303.13, 303.14, 354; 83/170, 171; 30/140

[56] References Cited
UNITED STATES PATENTS

| | | | |
|---|---|---|---|
| 2,768,276 | 10/1956 | Arntzen | 219/221 |
| 2,844,697 | 7/1958 | Emmerson | 219/233 |
| 3,143,635 | 8/1964 | Hooker | 219/221 |

FOREIGN PATENTS OR APPLICATIONS

| | | | |
|---|---|---|---|
| 911,957 | 4/1946 | France | 219/234 |
| 1,065,401 | 1/1954 | France | 219/225 |
| 1,046,133 | 12/1958 | Germany | 81/9.5 B |

Primary Examiner—Robert C. Riordon
Assistant Examiner—Roscoe V. Parker
Attorney—Fidelman, Wolffe & Leitner

[57] ABSTRACT

The present invention relates to a group of hand thermal tools of simplified construction wherein each has the same upper and lower hand grip members hinged together adjacent to their rear ends and moreover the upper and lower grip member may be identical. A power lead line, extending in at the rear of the grip members, powers each tool. The three distinct thermal hand tools contemplated are; resistance tweezers, conductive tweezers, and wire stripper. The resistance tweezers has a single conductor rod in each grip member extending the length thereof and a tweezer blade removably mounted at the forward end of each rod whereby an electrically conductive object tweezed between the blades becomes resistance heated. The conductive tweezers and the thermal wire stripper each utilize a pair of conductive rods in each grip member extending the length thereof and a resistance heated blade member mounted across the forward ends of each rod pair. In the conductive tweezer, a gripping blade is removably mounted across the forward ends of each rod pair, the blades being opposed so that an object tweezed therebetween becomes heated by thermal conductivity. In the wire stripper, a cutting blade is mounted across the forward end of each rod pair, the blades being in opposing cutting relationship whereby an insulated wire may have the insulation stripped therefrom by the cutting action of the heated blades.

4 Claims, 30 Drawing Figures

Patented Aug. 14, 1973

THERMAL HAND TOOLS

This application is a continuation-in-part of Ser. No. 41,325, filed May 28, 1970 and now abandoned.

The present invention is directed to a group of hand thermal tools and more specifically to a resistance tweezers, a conductive tweezers and a thermal wire stripper and to a hand grip structure which forms a subcomponent portion of these tools. Although the tools themselves are quite diverse, their structural details are so intimately related, including many components in common, that they constitute a unitary group.

A skilled repair technician in the electronics industries faces certain severe problems. To make repairs of a quality consistent with that of original manufacture, he requires sophisticated specialized hand tools. Yet, truly skilled electronic repair technicians are so few they represent a miniscule market for the manufacturer of such tools. In consequence, tools for electronics repair technicians are expensive, are often poorly constructed, and frequently represent a compromise between tool quality and manufacturing costs. The manufacturer is in a poor position. Can he justify a substantial investment in a specialized hand tool when, after all has been done, the sales potential may be inadequate to cover manufacturing and sales costs with enough profit to recoup development expenses?.

The problem facing both the repair technician customer and manufacturer can be eased by grouping several diverse hand tools into a single manufacturing entity, as has been done in the present invention, so that the total sales potential of the entity is greater. The present invention, then, makes high quality hand tools available at prices which should satisfy customer and manufacturer alike.

The present invention provides three distinct and separate specialized tools to the repair technician; a conductive tweezers, a resistance tweezers and a thermal wire stripper. These hand tools are not convertable one to another. A properly equipped electronics repair technician should have all three tools. However, all three tools contain many common components, and overall, are so similar that they constitute a single entity, from the manufacturer's viewpoint. In particular, the hand grip members present in each of the three tools are the same. Moreover, in a preferred embodiment, the hand grips are constructed so that the upper and the lower hand grip members in each tool are identical. Accordingly, the manufacturer of these tools can expect a far larger demand for the component elements he must obtain by manufacture or purchase. Specifically, he may count on as much as a six-fold increase in his needs for the grip member, even if sales for each individual hand tool is no greater than heretofore. High volume manufacturing techniques may be employed, such as for example forming the grip member as a molded plastic element. Unit costs are diminished substantially, higher quality specialized tools can be manufactured at competitive prices.

For further understanding of the present invention, reference is now made to the attached drawings wherein.

Figure 1:
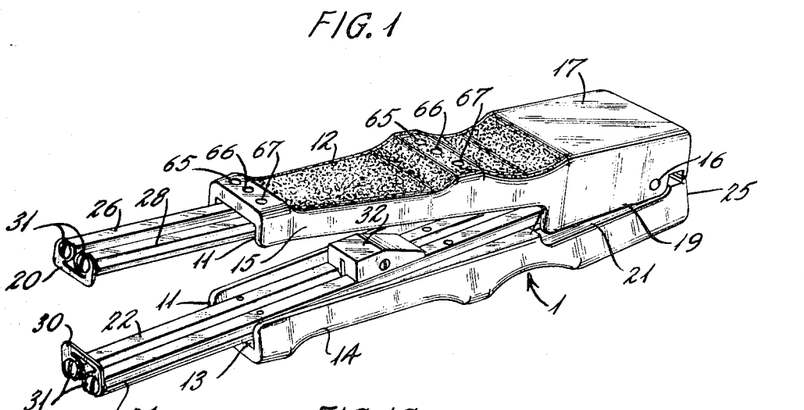
FIGS. 1, 1a and 1b are isometric views showing the three thermal tools side by side.
Figure 1A:
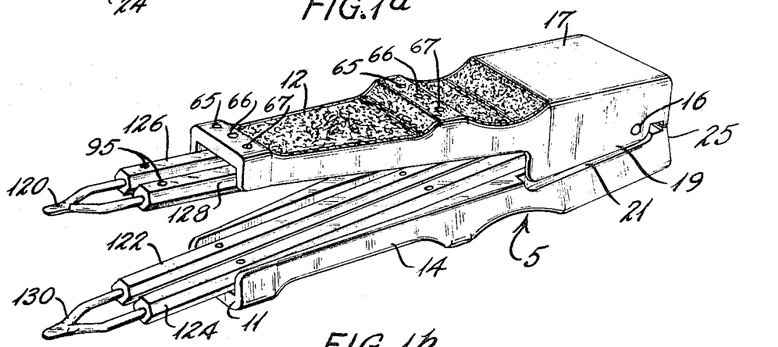
Figure 1B:
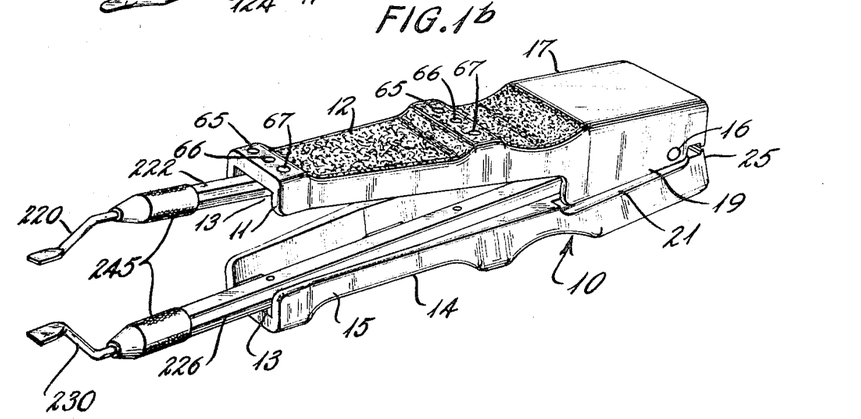

As may be seen in the drawings, and in particular in FIGS. 1, 1a and 1b, the wire stripper 1, the conductive tweezers 5, and the thermal resistance tweezers 10, shown respectively in FIGS. 1, 1a, and 1b, are three diverse hand thermal tools. Their construction does not permit conversion of one tool into another. A well equipped skilled electronics repair technician should have all three tools. Yet, their construction is essentially the same. This will be further illustrated during the detailed description of the individual tools which follows; the interchangeable component elements are identified by the same numerals in all three tools.

All three tools include a pair of hand grip members 12 and 14 hinged together by a hinge pin 16. In the preferred embodiment illustrated in the drawing, hand grip members 12 and 14 are identical in structure.

The grip member 12 or 14 is formed with a front end portion thereof as a U-shaped channel 11 with a channel bottom 13 wide enough to seat a pair of spaced conductor rods 22,24. Side walls 15 essentially conceal the conductor rods. The base end portion 17 of the grip member has an external flange 19 on one side and an internal flange 21 on the other side. As may be seen in FIG. 11, when a pair of grip members 12,14 are assembled, the external flange 19 will overlie internal flange 21. Hinge pin 16, which secures grip members 12,14 together extends through apertures in flanges 19 and 21 and the bosses 21' in each grip member. For better operation of the hinge member spacers 23 are provided and located between internal flanges 21 and bosses 21'. Just forward of hinge pin 16 (See FIG. 10) is a well 72 in which seats a spring 70 to urge the hand grips into a spread-apart position (shown in FIGS. 5 and 8). For electrical connection purposes, the rear face 25 of the grip member contains a circular aperture which leads into passageway 53. The grip members fit together well.

Normally, the grip member will be a molded plastic piece, e.g., carbon black and fiberglass filled nylon. The molds are relatively expensive. Use of the same grip members for several tools spreads the mold expense over more units and permits utilization of molded plastic grip members for such low volume products as the hand tools of the present invention. The above described preferred grip identity necessitates only one set of molds for three tools.

In thermal wire stripper 1, a pair of elongated conductor rods 26 and 28 are concealed within the hand grip 12 resting in and secured to channel bottom 13 at the underside of grip 12. Conductor rods 22 and 24 rest within and are secured to grip member 14 also being largely concealed by the depending (or upstanding) side walls 15 of the hand grip member. The conductor rods are fixed to the hand grip member by conventional expedients such as, for example, screw members 29 threaded through recessed holes in the rods and tapped holes in grip members 12 and 14.

Figure 3:
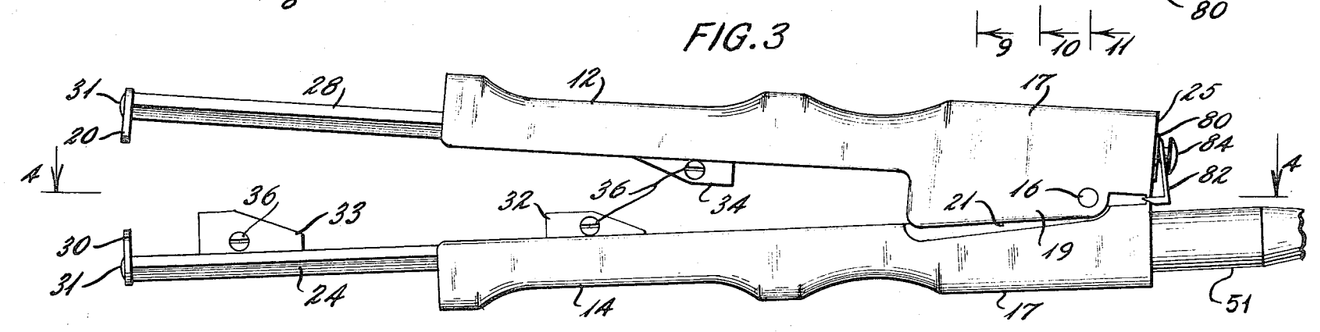
FIG. 3 is a side view of the wire stripper in an open position.
Figure 4:
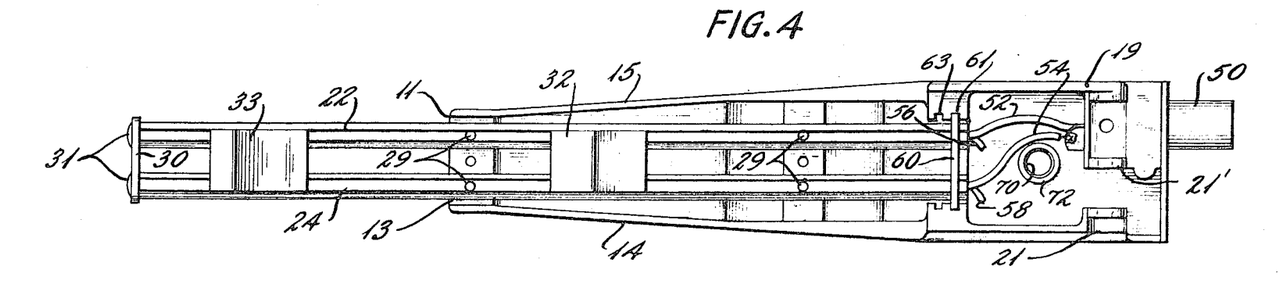
FIG. 4 is an inside view of one of the grip members taken along line 4—4 of FIG. 3.

Mounted across the forward end face of rods 22 and 24 is a cutter blade member 30, the blade being removably secured thereon as for example by screws 31 threaded into tapped recesses in the end faces of rods 22 and 24 (as shown in FIG. 3). A like blade member 20 is mounted on the forward end faces of rods 26 and 28. Blades 20 and 30 constitute the wire stripping blade components of thermal wire stripper 1.

Figures 5, 6, 7, 8, 9, 10, 11:
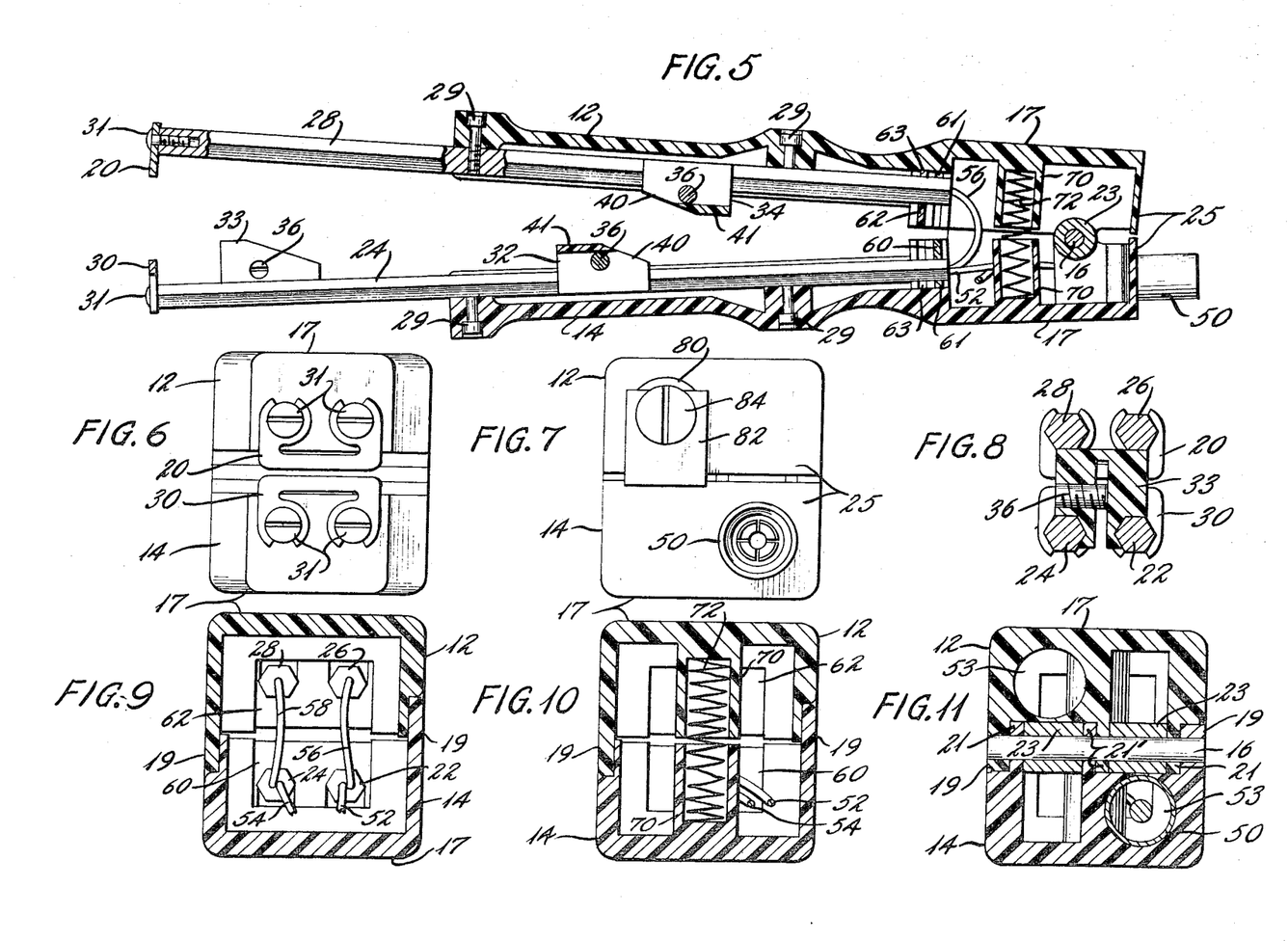
FIG. 5 is a side section taken along line 5—5 of FIG. 2.
FIG. 6 is a front view of the wire stripper in closed position.
FIG. 7 is a rear view of the wire stripper in closed position.
FIG. 8 is a section taken along line 8-8 of FIG. 2.
FIG. 9 is a section taken along line 9-9 of FIG. 2.
FIG. 10 is a section taken along line 10-10 of FIG. 2.
FIG. 11 is a section taken along line 11-11 of FIG. 2.

Advantageously, the conductor rods 22, 24, and 26, 28 also serve as guides for adjustable stop members 32, 33 and 34, which stop members, desirably, are of identical construction. As shown in FIGS. 3 and 5, opposing stop members 32 and 34 contact each other to stop the grip members 12, 14 from closing fully. Normally, the blades 20,30 are stopped short of the completely closed position by the action of stop members 32 and 34. The purpose of this stop member arrangement is to permit cutter blades 20,30 to sever the insulation around a wire lead, while insuring that the wire conductor also is not cut. The third stop member 33 is provided as a convenient spacer member, for measuring off the length of wire insulation to be stripped.

Figure 15:
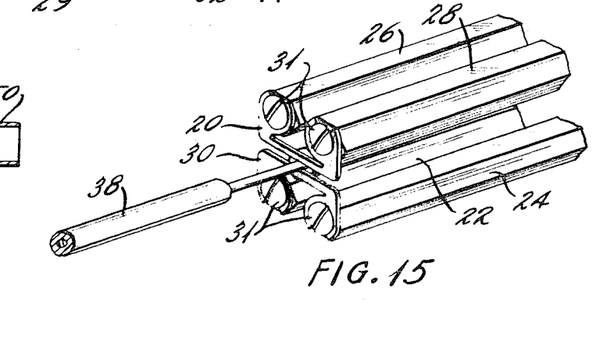
FIG. 15 is a fragmentary perspective of the wire strippers stripping wire.

As may be seen in FIGS. 5 and 8, the stop members, e.g., stop member 33 is apertured or cut out at its base to fit the rods 22,24 and to slide thereon. Use of the hexagonal shaped rods illustrated in the drawing requires a corresponding hexagonal multi-facet cutout on stops 32, 33, 34, for the desired close fitting slide engagement. The top of each stop has a beveled surface 40 and a horizontal surface 41. Normally, stops 32 and 34 are disposed in opposition so that closing motion of the grips 12 and 14 brings the beveled surfaces 40 into engagement with blades 20 and 30 spaced apart as shown in FIGS. 6 and 15. To repeat, thermal wire stripper 1 is constructed to strip insulation from a wire rather than to cut the wire. As may readily be appreciated, a shift in the position of either stop 32 or 34 will cause the beveled surfaces 40 to contact higher or lower and thereby allow the closed position gap between blades 20 and 30 to be closely predetermined.

The stops 32, 33 and 34 are constructed so that they may be locked in place. As best illustrated in FIG. 8, it may be seen that the lower portion of the stop 33 is split longitudinally leaving a gap from the bottom edge of the stop to some midpoint in the stop. A screw member 36 threaded into the side of stop 34 wedges the split or bifurcated lower portions of the stop 33 apart, thus locking them to the rods 22 and 24 by frictional engagement therewith. Partially unthreading screw member 36 unbinds stop member 33 and it may then slide as desired along rods 22 and 24. Stops 32 and 34 are positioned according to the size of the wire being stripped to stop blades 20,30 short of severing the wire. The spacing stop member 33 is locked to rods 24 and 22 at whatever distance from blades 20 and 30 should be the measure for the length of insulation being stripped. The lead 38 is inserted past blades 20 and 30, as shown in FIG. 15, until it contacts the forward face of stop member 33, then the thermal wire stripper 10 is closed to sever the insulation from the lead. The stop members 32, 34 and 33 are particularly useful when a number of leads have to be stripped to the same length.

Electrical power for thermal stripper 10 is provided from a plug 50 which extends into lower grip member 14 from the rear thereof passing through the aperture in rear face 25 into passage 53. This is a preferred alternative to a permanently attached power line at the rear of thermal stripper 10. The power line 51 is only a temporary attachment to inlet plug 50 and thermal wire stripper 1. Lead lines 52, 54 extend into grip member 12 from plug 50 being connected to rods 22 and 24 and also by leads 56 and 58 to rods 26 and 28. The electrical connections are diagrammatically illustrated in FIG. 14.

Just forward of the wire connections to the rear of the conductor rods 22, 24, 26 and 28, a pair of shield members 60 and 62 may be disposed in grooves 61 and 63 of the grip members with shield 60 mounted on the lower rods 22 and 24 in groove 61 on grip 14 and shield 62 mounted on the upper rods 26 and 28 in groove 63 of grip 12. Presence of shields 60,62 is optional. The rods 22, 24, 26 and 28 conduct the electric current which serves to resistance heat blades 20 and 30. To repeat, the hand grip members 12 and 14 and shields 60 and 62 are molded from insulating plastic materials (such as hard rubber, nylon and the like) to protect the user.

Figure 2:
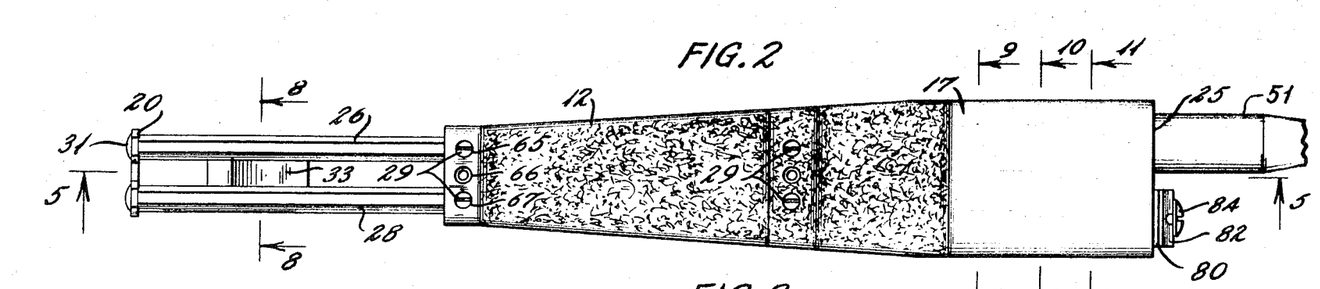
FIG. 2 is a top plan view of the wire stripper (in closed position)

Hand grip members 12 and 14 are biased apart by the soft compression coil spring 70 seated in wells 72 just forward of hinge pin 16 (as shown in FIGS. 5 and 10). In passing it may be noted that a leaf spring may be substituted for coil spring 70. Such a spring might well extend between grip members 12,14 adjacent the path of wire lead 58 (see FIG. 5). A rear adjustment block 80 (see FIGS. 2 and 3) limits the extent to which the grip members 12 and 14 are sprung apart. The rear aperture and passage 53 of upper grip member 12 contains a press fit insert 80 (FIGS. 3 and 7) to which adjustment block 82 is secured, as for example by screw member 84 threaded into insert 80. The position of screw 84 sets adjustment block 82 and predetermines how far apart the grips 12 and 14 are spread by compression spring 70 or other spring means. Presence of adjustment block 82 is advantageous, since the spread can be adjusted for the lead to be stripped by wire stripper 1, or, in the instance of tweezer 5,10 for the size of the object tweezed.

The high degree of symmetry in the thermal wire stripper 1 is noteworthy. Grip members 12 and 14 may of course be identical. Rods 22, 24, 26 and 28 are identical. The stops 32, 33 and 34 are identical. So too are shields 60 and 62 and blades 20 and 30. Also noteworthy is the structural simplicity of the tool; component parts may have a dual function. Thus, conductor rods 22, 24 and 26 and 28 serve both as conductors and as guide rods for stops 32, 33, 34.

The same grip members 12 and 14 and all associated structure including spring 70, hinge pin 16, the adjustment block structure of members 80, 82, 84, and even the bar stock from which conductor rods 22, 24, 26, 28 are cut is the same in all three tools 1, 5, 10. This use of the same major components is illustrated in the side by side showings of FIG. 1, 1a and 1b.

Figure 14:
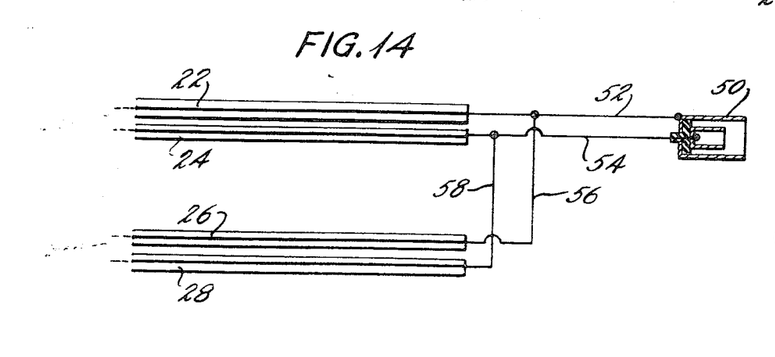
FIG. 14 is a circuit diagram of the electrical connections in the thermal wire stripper.
Figure 16:
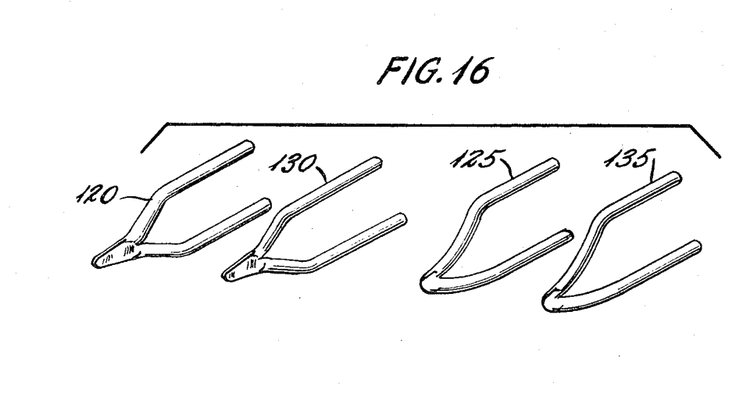
FIGS. 16 and 17 illustrate various modes of conductive tweezer blades.
Figure 17:
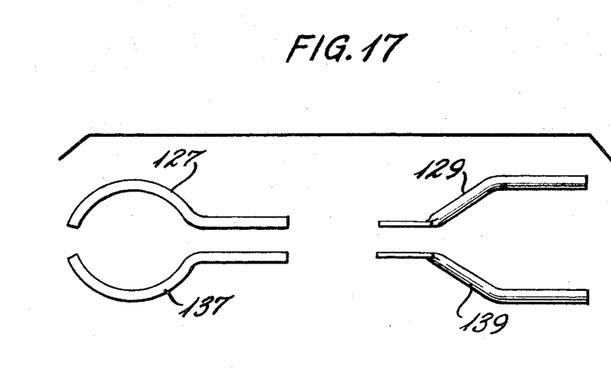
Figures 18, 19, 20:
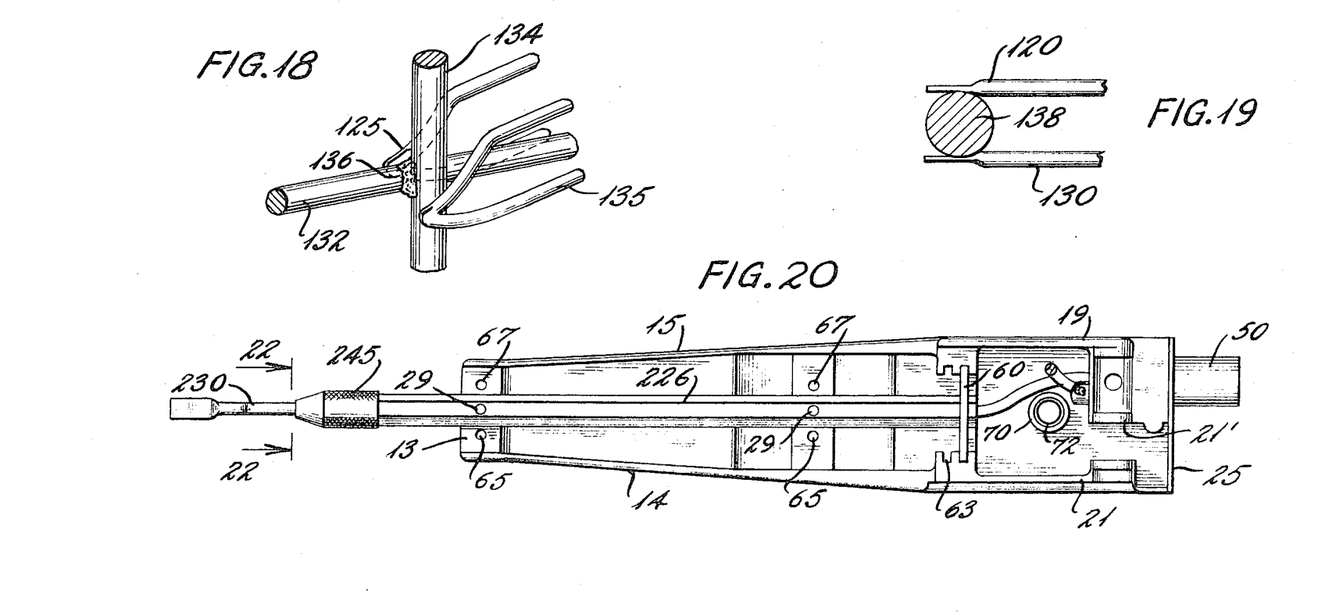
FIGS. 18 and 19 are fragmentary views illustrating how the conductive tweezer blades grip the objects tweezed therebetween.
FIG. 20 is a view similar to FIG. 4 taken along the median line of the resistance tweezers.

The conductive tweezers 5 is structurally most like thermal wire stripper 1. It contains not only hand grips 12 and 14, but a pair of similar conductor rods 122, 124 & 126, 128 in the grip member. Also, the electrical connections to the rods are the same as is shown in FIG. 14. Of course, wire stripper cutter blades 20 and 30 have been replaced by conductive tweezer blades 120 and 130. The principal difference between the tools resides in the blade structure. In a preferred embodiment of conductive tweezers 5, the conductive rods are not interchangeable with those of wire stripper 1. However, the rods for each tool are formed from the same bar stock. FIGS. 16 and 17 illustrate various blade shapes. One form of blade is shown as blades 102 and 130. A more highly curved blade set 125 and 135 are illustrated in FIG. 16. FIG. 17 shows blade set 127, 137 and 129 and 139. FIG. 18 illustrates how blades 125 and 135 may grip and conductively heat a pair of intersecting leads 132, 134, to melt a soldered connection 136 apart. FIG. 19 illustrates how blades 120 and 130 can grip and heat a cylindrical wire lead 138.

Figure 12:
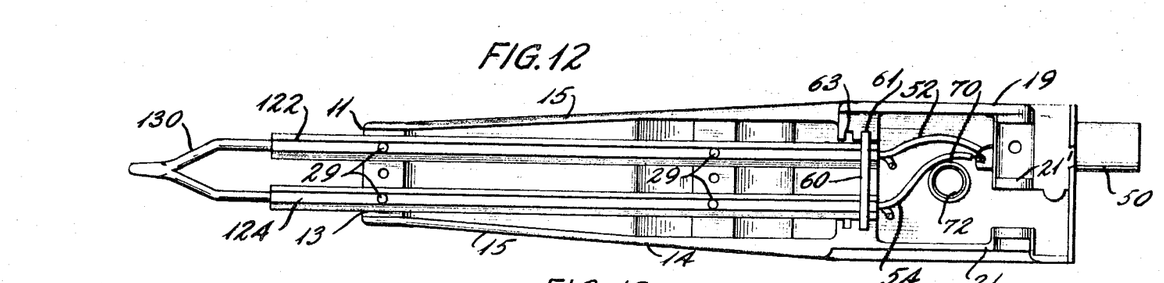
FIG. 12 is a view similar to FIG. 4 only taken through the median line of the conductive tweezers.
Figure 13:
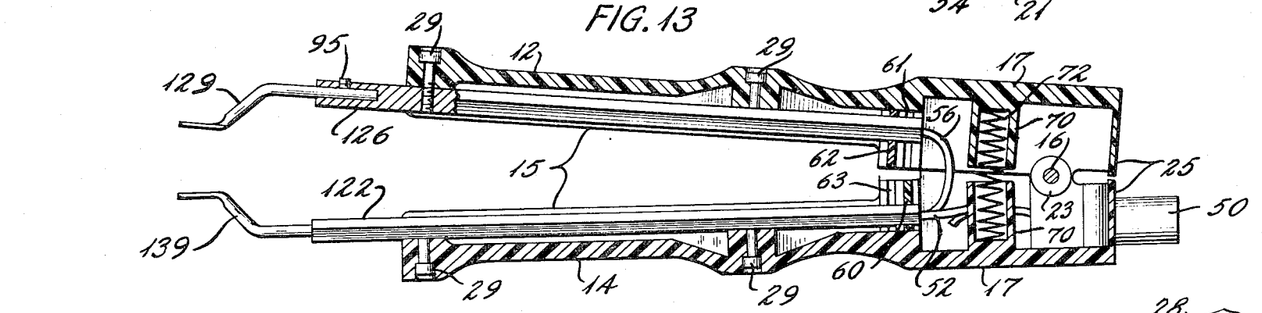
FIG. 13 is a side section similar to FIG. 5 of the conductive tweezers.

Normally, the conductive tweezers would be provided with a full set of differently sized and shaped conductive tweezer blades, including, for example, all those illustrated in FIGS. 16, 17. Accordingly, conductive tweezer 5 contains provision for re-placing the blades. As is shown in FIG. 12, the front face of each conductor is apertured to provide a blind opening therein into which a base end of blade 120, for example, may be inserted. Set screws 95 lock blade 120 to rods 126 and 128. The blind opening and set screw structure is provided in all four conductive rods 122, 124, 126 and 128 to lock the conductive tweezer blades in the desired opposing relationship.

Resistance tweezer 10 differs from the other tools in that only one conductor rod seats inside in each grip member. Thus, as may be seen in FIG. 21, single conductor rods 222 and 226 are mounted centrally of grip member 12 and 14. The grip member is however the same as in the other tools, as are the various appurtenances thereto like spring 70, hinge pin 16, plug 50, etc. The wiring is different since a connection to each rod is all that is needed. Desirably, the molded grip member is made with sets of three apertures 65, 66, 67 (which may be tapped) as shown in FIGS. 1, 1a and 1b, so that two rods may be mounted side by side using apertures 65, 67, as is the instance with conductive tweezers 5 and thermal wire stripper 1, or one rod may be mounted centrally using aperture 66 as is the instance with resistance tweezers 10.

Figures 21, 22:
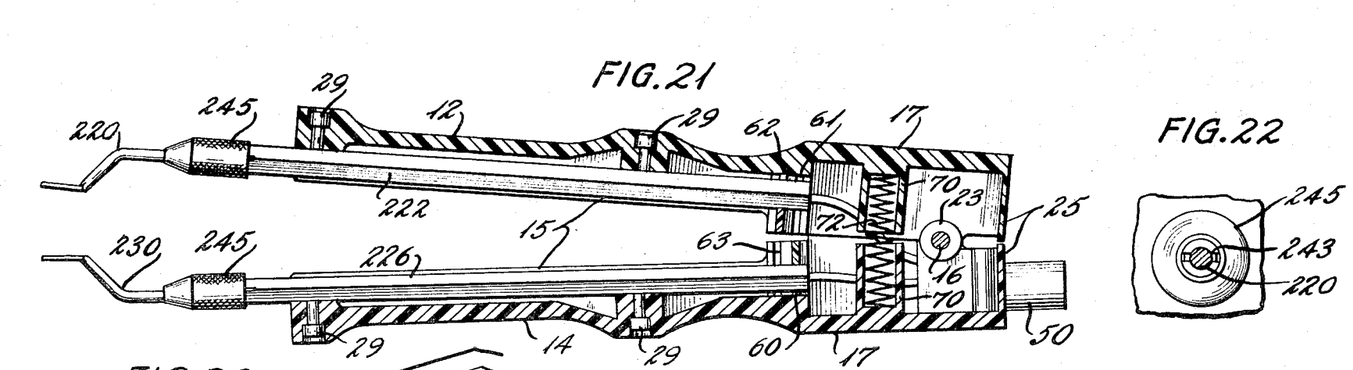
FIG. 21 is a side section similar to FIG. 5 of the resistance tweezers.
FIG. 22 is a front end section taken along line 22—22 of FIG. 20.

In a preferred embodiment of resistance tweezer, the forward end of the conductor rods 222 and 226 is straight as illustrated in FIG. 21. The resistance tweezer 10 is useful in any instance where the tweezed object is metallic e.g., a connector pin, capable of being resistance heated to the desired level by passage of current therethrough. However, some danger of arcing exists with use of the resistance tweezer, and in instances where arcing must be avoided, the conductive tweezer may be the preferred tool.

Figure 23:
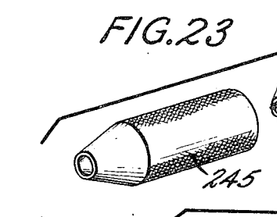
FIG. 23 is an enlarged exploded view of the collet structure at the forward end of the resistance tweezers.

In the instance of conductive tweezers 5, a set screw is used for attaching the blade to the conductive rods. The same may be done with the resistance tweezer blades, but this structure is considered a less preferred embodiment than the collet structure illustrated in FIGS. 20 through 23. The collet structure involves a rounded off forward end portion on the conductor rods 222 and 226 (shown in FIG. 23) and a threaded section 241 thereon. The forward end face of the rod is provided with a slot 243 which extends rearwardly to threaded portion 241 and beyond. The resistance tweezer blade is disposed inside the slot 243 and is locked thereon by threading collet 245 onto the threaded section 241.

Figure 24:
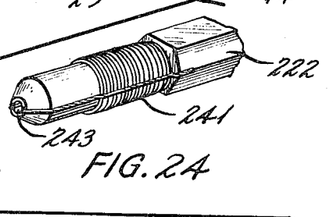
FIG. 24 illustrates several modes of resistance tweezer blades.
Figure 25:
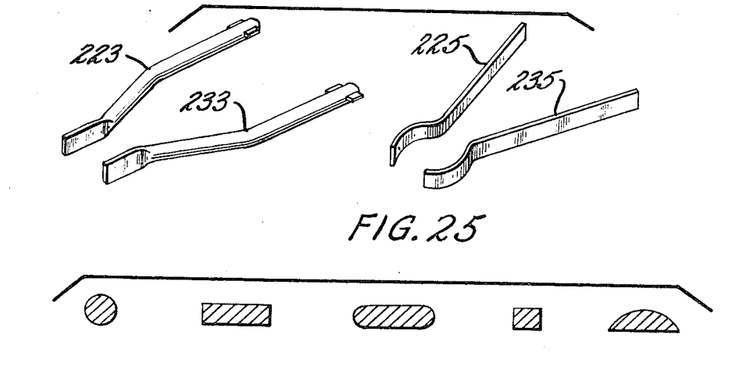
FIG. 25 illustrates the cross-sectional shape of several modes of resistance tweezer blades.
Figures 26, 27, 28:
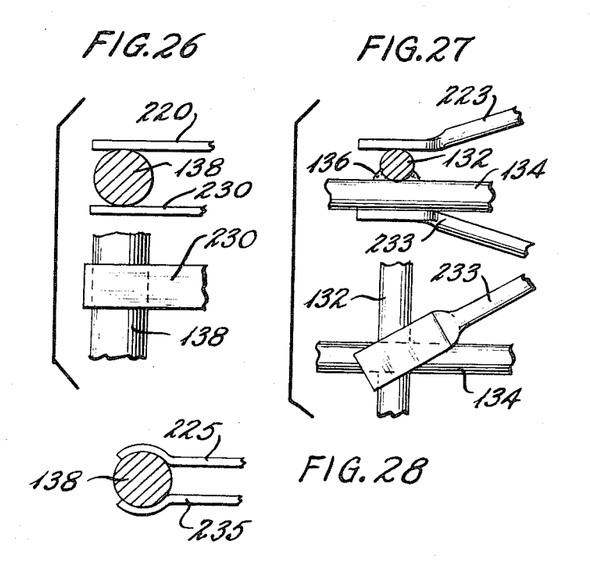
FIGS. 26, 27, and 28 illustrate how the resistance tweezer blades may grip an object therebetween.

If desired, slot 243 may be a composite slot so that various cross section tweezer electrodes may be employed, i.e., the round, flat, square, half round, cross section shapes illustrated in FIG. 25. A preferred shank end structure involves a tang 225 on each side of the blade. The tang structure locks the shank end of blades 223, 233 into the composite slot 243. The forward end of the resistance tweezer blades or electrodes also may be varied. Normally, a full set of different blades would be provided with the resistance tweezers, including the flat and concave blades 223, 233 and 225, 235 illustrated in FIG. 24. A full set of blades permits resistance tweezers 10 to grip varying leads 138 and electrical lead connections 132, 134 in the manner illustrated in FIGS. 26, 27 and 28 to grip same and to resistance heat same by passage of electric current therethrough. For example, a soldered connection 136 might be grasped directly between the electrodes of the resistance tweezer and resistance heated until the solder melts; the wires can then be separated. The probable use of several different tweezer blades during the course of a repair job is what makes the quicker release collet structure preferable to the set screw structure contemplated for conductive tweezers 5. In addition, conductive tweezers 5 have two points of connection for each blade whereas the resistance tweezer has only one connection for each blade.

Accordingly, it may be seen that the present construction of the three tools involves a very high degree of manufacturing interchangeability and multiple use of component parts. A sale of the three tools involves disposition of as many molded grip members, a substantial length of the bar stock from which the several conductor rods are formed, etc. Indeed, only the blades and their mounting elements are specific to each tool. All in all, a higher quality tool can be provided to the repair technician than heretofore.

What is claimed is:

1. A thermal wire stripper comprising;

upper and lower insulated grip members hinged together adjacent the rear ends thereof;

a pair of electrically conductive guide rods disposed in each grip member and extending forward of said grip member;

an electrically conductive blade member disposed across the forward end faces of each rod pair, the blades being in opposing cutting relationship;

an electrical power lead connection at the rear of said grip members connected to each rod pair to cause resistance heating of the blades;

an adjustment means mounted at the rear of said members adjustably limiting the maximum open position spread of said grip members; and stop block means slidably mounted on the rods adjustably limiting the closest approach permitted for the blade members.

2. A thermal wire stripper according to claim 1 including a stop block slidably mounted on the rods in the lower grip member said stop block having a beveled upper surface; and an identical stop block slidably mounted on the rods of the upper grip member, the engagement position of the beveled surfaces predetermining the closest approach permitted for the blades.

3. A thermal wire stripper according to claim 2 wherein a third identical stop block is slidably mounted on one of the rod pairs adjacent the blade end thereof, said third block serving as a spacer element to predetermine the length of wire to be stripped.

4. A thermal wire stripper according to claim 1 wherein the grip members are identical.

* * * * *